Nov. 2, 1937.　　　　　F. C. BEST　　　　　2,097,437
MOTOR VEHICLE
Original Filed March 6, 1933　　4 Sheets-Sheet 1
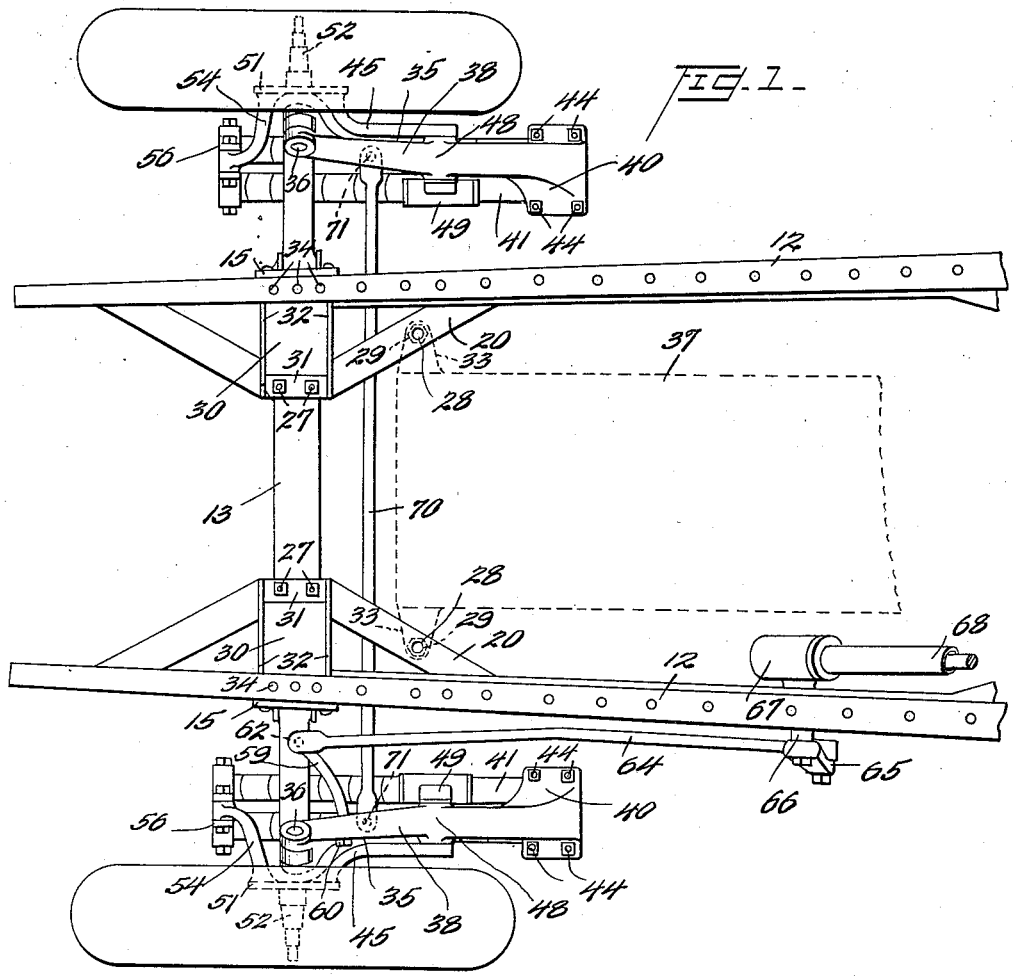
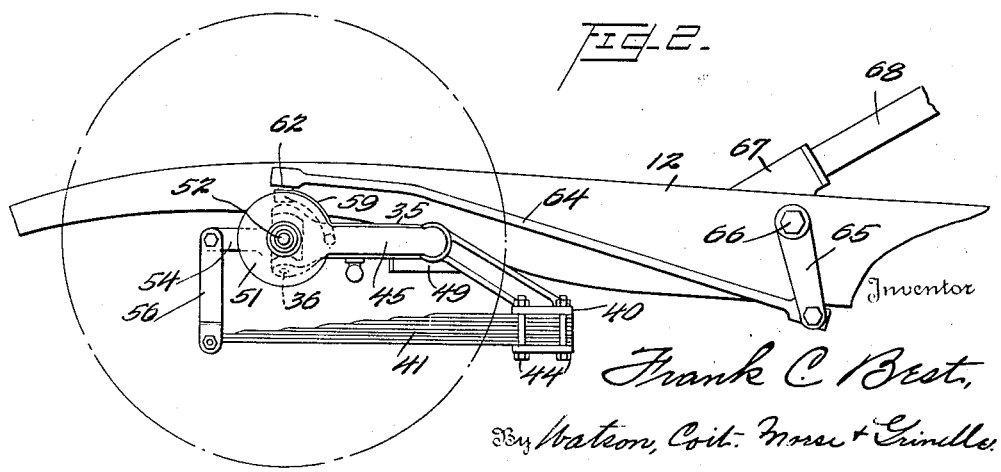

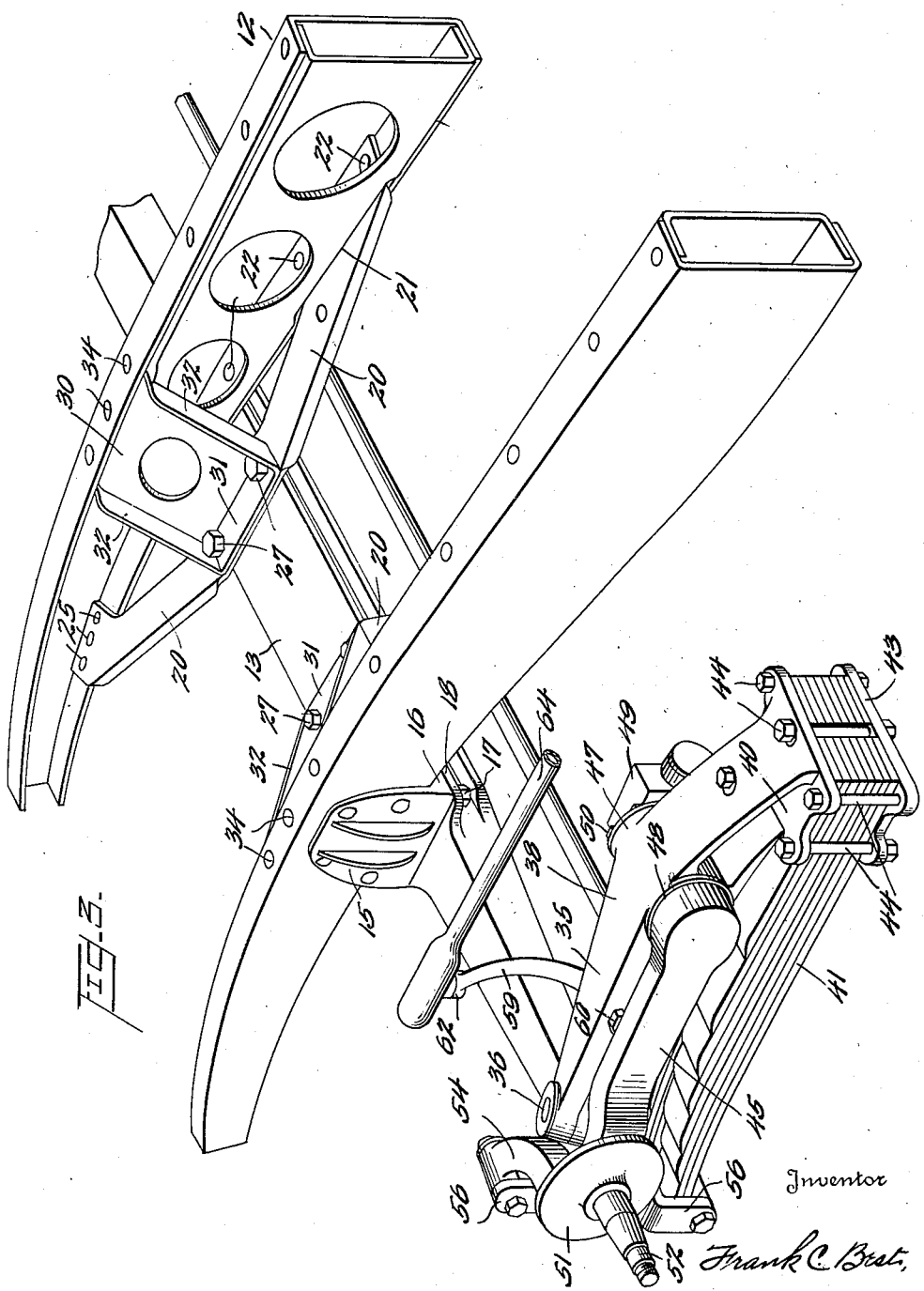

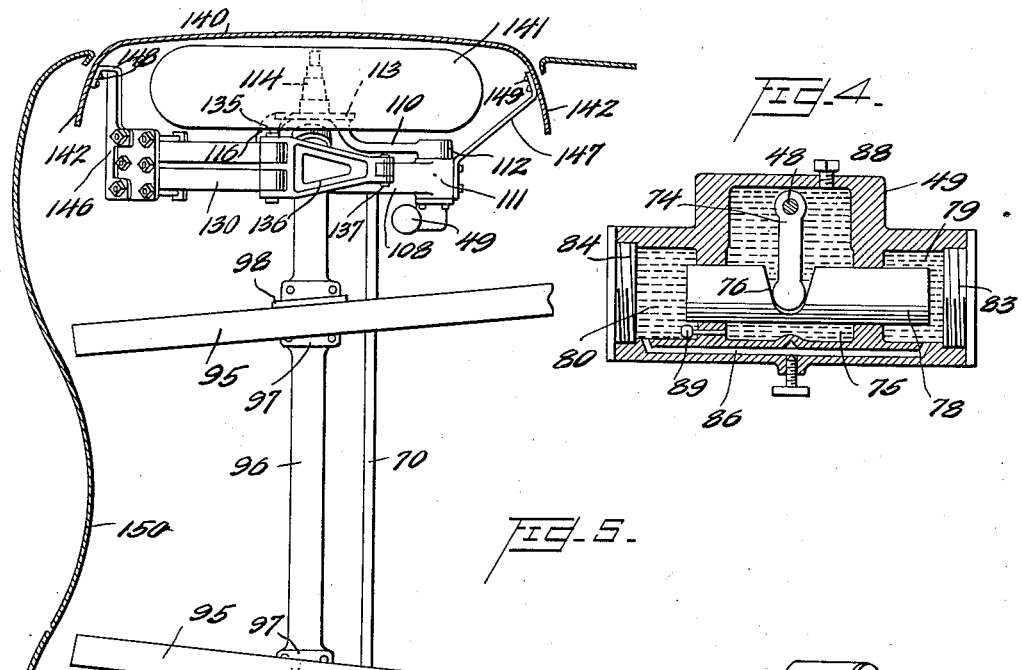

Nov. 2, 1937.     F. C. BEST     2,097,437
MOTOR VEHICLE
Original Filed March 6, 1933     4 Sheets-Sheet 4
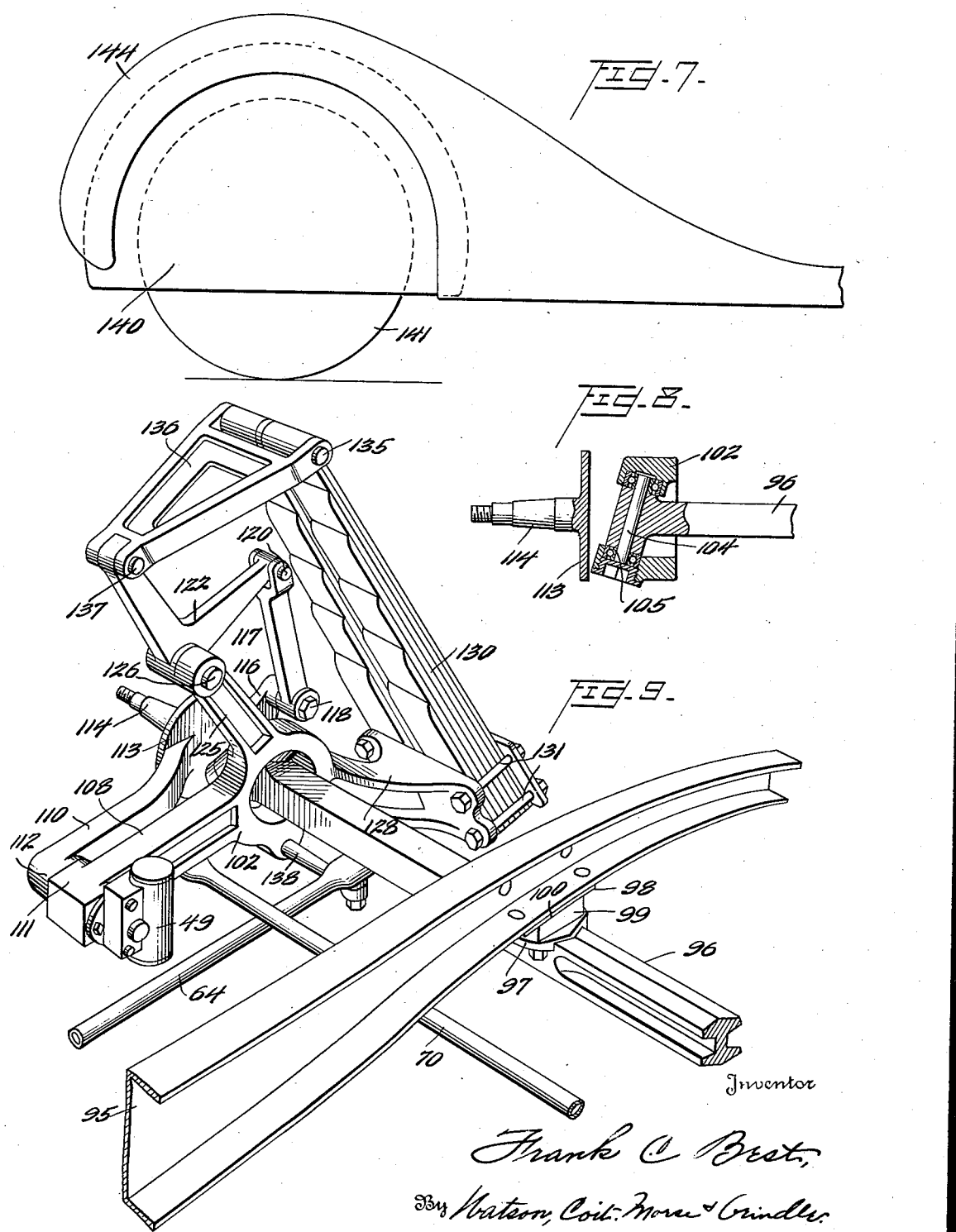

Patented Nov. 2, 1937

2,097,437

UNITED STATES PATENT OFFICE 2,097,437

MOTOR VEHICLE

Frank C. Best, Detroit, Mich., assignor to Packard Motor Car Company, Detroit, Mich., a corporation of Michigan Application March 6, 1933, Serial No. 659,879
Renewed July 7, 1937

5 Claims. (Cl. 280—124)

This invention relates to motor vehicles and more particularly to improvements in the vehicle frame and wheel suspensions.

It is the principal object of the invention to provide a construction in which the road wheels are independently sprung and in which the support for the steerable road wheels is carried by the vehicle frame, so that the entire steering mechanism may be supported on the frame and is thus not subjected to movement as the result of relative movement in a vertical sense of the road wheels and the frame when the vehicle is driven on an uneven road bed. Thus it is a feature of the invention that the usual steering knuckle or the equivalent thereof is carried on the vehicle frame and thus partakes of no movement with respect to the frame other than the usual swinging movement in a substantially horizontal plane for steering purposes.

It is a further object of the invention to provide in a construction of this character yielding means, acting between the steering knuckle and the steerable road wheel assembly, for resisting vertical movement of the latter, this yielding means being preferably of the leaf spring type.

A more specific object of the invention is the provision of a steering knuckle carried by the vehicle frame, an arm supporting the road wheel assembly and pivotally connected to the steering knuckle for substantially vertical movement, and a leaf spring carried by the knuckle and connected with the wheel assembly to resist vertical movement thereof, the arm and the leaf spring extending generally longitudinally of the vehicle rather than transversely to permit the use of a spring of sufficient length to allow the necessary vertical movement of the road wheel.

It is also a feature of the invention that the steering knuckles are carried by a dead axle extending transversely of the frame and secured to the usual side frame members, this axle serving to tie the side frame members together, and that bracing members are provided which act between the side frame members and the axle to effectively resist the various stresses to which a vehicle frame is ordinarily subjected. In the preferred form of the invention one or more of the bracing members are utilized as a support for the motor.

It is also an object of the invention to provide a wheel fairing to reduce the wind resistance of the wheel and associated parts, this fairing being supported on the steering knuckle and movable therewith.

Further objects and features of the invention will be apparent from the following description taken in connection with the accompanying drawings, in which Figure 1 is a plan view of a portion of a motor vehicle chassis illustrating one embodiment of the present invention;

Figure 2 is a side elevation of the wheel supporting and steering mechanism shown in Figure 1;

Figure 3 is a perspective view of the wheel supporting mechanism and frame;

Figure 4 is a sectional view showing the conventional elements of a shock absorber;

Figure 5 is a plan view corresponding to Figure 1 but showing a modified construction;

Figure 6 is a side elevation of the wheel supporting and steering mechanism shown in Figure 5;

Figure 7 is a side elevation of the forward end of the vehicle showing the fender and fairing in position;

Figure 8 is a vertical section taken substantially on the line 8—8 of Figure 6; and Figure 9 is a perspective view of the wheel supporting and steering mechanism.

While specific language is used herein to describe the two embodiments of the invention selected for the purpose of illustration to afford a better understanding thereof, it will be appreciated that no limitation of the invention is thereby intended and that such alterations and further modifications of the disclosed construction are contemplated as fall within the spirit of the invention.

Referring first to the arrangement shown in Figures 1 to 3 inclusive of the drawings, it will be observed that the vehicle frame is shown as comprising the side frame members 12 and the axle 13, it being understood that the body of the vehicle is supported in the usual manner on the side frame members. The axle 13 is preferably secured rigidly to the side frame members and serves as a cross frame member to tie the side frame members together. Thus each side frame member may be provided with an L-shaped supporting bracket having an upstanding leg 15 riveted or otherwise securely fastened to the outer side of the member and an inwardly extending leg 16 lying under the member, bolts 17 being employed to rigidly connect the parts, these bolts extending through suitable apertures in a flange 18 formed on the axle, the bracket leg 16, and the lower flange of the side frame member.

Diagonal bracing members 20 may also be provided, one being employed at each side of the frame. It will be observed that the major portion of the side frame members are of box construction, the inner sides thereof being cut away at 21 to permit the passage therethrough of the bracing member which rests on the lower flange of the side frame member and is riveted or otherwise secured thereto as indicated at 22 at a point spaced rearwardly from the axle 13. Each bracing member 20 is also secured forwardly of the axle as shown at 25 to the lower flange of the side frame member and is bowed inwardly intermediate its points of attachment to the latter. Each bracing member is rigidly secured to the axle, for instance by means of bolts 27 and these bolts may also be employed to secure a reinforcing member 30 to the axle. Thus the member 30 may be provided with a flange 31 at its lower end resting directly on the bracing member 20, side flanges 32 serving to increase the rigidity thereof. An outwardly extending flange is also provided at the upper end of the member 30, the latter flange engaging the upper flange on the side frame member and being secured thereto, for instance by means of bolts or rivets 34.

The motor is preferably supported at its forward end on the bracing members 20, and for this purpose the latter may be provided with apertures 28 for the reception of bolts 29, the latter extending through the usual supporting feet 33 projecting laterally from the base of the motor 37. Other means of supporting the motor may, of course, be substituted for that shown; thus conventional types of rubber supports may be interposed between the motor feet and the bracing members.

It will be observed that this construction affords an exceedingly rigid connection between the several main structural members of the frame which effectively resists any torsional stresses and which is at the same time light and relatively inexpensive to manufacture.

Referring now more particularly to the means which directly supports the wheels for steering and vertical movement, it will be seen that a steering knuckle 35 is supported on each end of the axle 13, it being observed that the term "steering knuckle" is used for convenience and is intended to cover any device or member supported for movement in a horizontal or nearly horizontal plane and adapted to carry a steerable road wheel, so that the vehicle may be steered by movement of the knuckle. Thus in the arrangement shown in the drawings, each knuckle 35 may be provided with a forked portion which is apertured to receive a king pin 36, the latter being supported adjacent the end of the axle, for instance passing through the axle and rigidly secured therein, the usual caster effect being secured by canting the pin 36. The precise manner in which the knuckle is supported on the axle is not an essential feature of the invention.

Reference will now be made to the arrangement associated with the knuckle at the left hand side of the vehicle for supporting the wheel since the construction at the right hand side of the vehicle is similar with one exception hereinafter pointed out.

The steering knuckle 35 is extended rearwardly to provide an arm 38, that end of the arm remote from the axle being provided with a flat face 40 on which one end of a leaf spring 41 may be carried, the spring being preferably clamped between the face 40 and a plate 43 by means of bolts 44 extending therebetween.

Intermediate its ends the arm 38 affords a pivotal support for a wheel carrying arm 45, for instance the arm 38 may be provided with a bearing portion 47 in which may be journalled a substantially horizontally extending spindle 48 formed on or secured to the rearward end of the wheel carrying arm 45. Preferably the spindle 48 extends through the arm 38 and projects from the inner side thereof into a shock absorber casing 49 which is secured to the arm 38, for instance by bolts 50, the shock absorber functioning to resist sudden relative movement of the arms 45 and 38.

At its forward end the arm 45 is formed to provide a substantially circular member 51 to which the brake backing plate may be secured, a wheel spindle 52 extending laterally from the arm, it being understood that the vehicle wheel is mounted for rotation on this spindle in the usual manner. Extending from the inner face of the member 51 and either formed thereon or secured rigidly thereto is an arm 54 which is connected with a link 56, the latter being pivoted to the arm 54 and to the forward end of the spring 41. It will thus be seen that the members 45, 51 and 54 make up a rigid link, intermediate the ends of which the vehicle wheel is supported. The spring 41 thus acts between a point rearwardly of the pivotal connection between the arms 45 and 38 and a point on the links 45, 51, 54, forwardly of the wheel spindle 52, permitting the use of a relatively long spring and giving the vehicle a "soft ride."

A steering arm 59 is rigidly secured to the arm 38, for instance the arm 59 may extend through the arm 38 and be secured therein by means of a nut 60, and is provided at its inner end 62 with a pivotal connection to the usual drag link 64. At its rear end the drag link is in turn pivotally connected to a steering arm 65 secured to a shaft 66 which extends through the side frame member 12 and into the usual steering gear housing 67 at the lower end of the steering column 68, the shaft 66 being rotated in the conventional manner from a steering hand wheel (not shown).

With respect to the steering mechanism, it will be observed that all of the elements thereof are carried by the vehicle frame and thus these elements partake of no relative movement in response to vertical movement of the road wheel on encountering an obstruction. This feature greatly increases the accuracy with which the vehicle may be steered and prevents the transmission of shock from the road wheels to the steering hand wheel.

When the shaft 66 and levers 65 are rocked in response to manipulation of the hand wheel, the drag link 64 will be shifted forwardly or rearwardly and by means of the steering arm 59, the steering knuckle 35 and the arm 38 thereof will be swung in a substantially horizontal plane on the axle 13 to steer the vehicle. This swinging movement of the knuckle 35 is of course imparted to the arm 45 which carries the wheel assembly, and the leaf spring 41 is likewise swung with the knuckle so that the connection between this spring and the wheel assembly is not affected by steering movement.

When an obstruction is encountered by the road wheel or when the vehicle is driven over uneven ground, the wheel assembly will swing upwardly about the point of pivotal connection between the knuckle arm 38 and the wheel carrying arm 45, and this vertical or substantially vertical movement is resisted by the leaf spring 41 acting through the link 56 and the arm 54.

In order that the two steerable road wheels may be swung together for steering movement, a cross tie rod 70 is provided, this rod having a pivotal connection as at 71 to the steering knuckle 35 at each side of the vehicle. It will now be appreciated that the construction on the right hand side of the vehicle is identical with that on the left hand side with the exception that the drag link 64 and the steering arm 59 are of course omitted.

Returning to the shock absorber enclosed within the casing 49 and referring more particularly to Figure 4 of the drawings, it will be observed that the spindle 48 is provided with an arm 74, rigidly secured to the spindle and depending within the main chamber 75 of the shock absorber. The lower end of the arm 74 engages a recess 76 in a double piston 78, the latter working in cylinders 79 and 80 formed at opposite ends of the absorber casing, these cylinders being preferably closed by elements 83 and 84 which are threaded into the respective ends of the casing.

The cylinders 79 and 80 are placed in communication by a passage 86, and it will be observed that on reciprocation of the double piston 78, fluid contained within the cylinders 79 and 80 will be caused to flow back and forth through the communicating passage 86. Such flow is resisted by suitably restricting the passage, for instance a regulating device consisting of a screw threaded element arranged to block the passage to a greater or less extent may be employed.

The shock absorber casing including the chamber 75 is supplied with oil or similar fluid, a filler opening and plug 88 being provided for this purpose.

The fluid within the chamber 75 acts as a source of supply for the communicating system including the cylinders 79 and 80 and the passage 86, a one-way valve 89 communicating with the cylinder 89 and the cylinder 75 being provided to permit flow of fluid from the chamber into the cylinder only, so that the supply of oil in the cylinders is automatically replenished from time to time.

It is obvious that the specific construction of this shock absorber forms no part of the present invention and that any conventional type of shock absorber may be readily applied to the construction shown in the drawings for the purpose of resisting sudden relative movement of the road wheel assembly and the steering knuckle and vehicle frame.

The various advantages of the present invention will be apparent from the foregoing description. In addition to those which have been mentioned, it will be observed that the total unsprung weight is unusually low with the result that the riding qualities of the vehicle are improved and the life of the vehicle tires is prolonged. The transmission of vibrations to the vehicle frame is materially reduced by reason of the reduction of the unsprung weight, and since the arms 45 and 38 extend approximately in the same direction and are substantially horizontal, the tendency of the vehicle to pitch fore and aft on sudden application of the brakes is eliminated, the thrust developed on braking the vehicle being transmitted directly to the frame, there being no substantial deflection of the spring 41.

It will also be observed that the springs are loaded in the vertical direction only, no torsional strain being applied under any conditions of operation, and that the springs are not used to tie parts of the vehicle together but function solely to yieldingly support the frame. Thus the springs are less likely to break and breakage of one or more springs has little effect on the normal functioning of the remaining vehicle parts, it being significant that the relationship of the remaining elements of the steering mechanism is not disturbed on breakage of a spring, thereby reducing the possibility of accident from this source.

Furthermore, by reason of the manner in which the road wheel is supported, there is no canting of the wheel when an obstruction is encountered at one side of the vehicle and thus the caster angle is not altered. This reduces the tendency of the vehicle to turn to one side or the other when passing over an uneven road bed.

Referring now to the modified construction shown in Figures 5 to 9 inclusive, it will be seen that the side frame members on which the vehicle body is supported are indicated at 95, the axle 96 constituting a structural member serving to tie the side frame members together. Connection between the side frame members 95 and the axle 96 may be effected as in the modification first described by securing these members rigidly together at either side of the vehicle, but alternatively a yielding or deformable means may be interposed between the axle and the side frame members to permit slight relative movement thereof. For instance, a plate 97 may be rigidly secured to the axle 96 and a supporting bracket 98 may be secured to the frame, a block 99 of rubber or other imperfectly elastic material being interposed between the plate 97 and the base portion 100 of the bracket 98, and being secured to both in any convenient manner, for instance by vulcanization. This construction not only serves to deaden shocks which would otherwise be transmitted from the axle to the frame, but is a compromise between the three point suspension and a four point suspension, preventing to some extent the transmission of forces from the axle to the frame which would result in twisting or weaving of the latter and at the same time ensuring reasonable stability of the frame on the axle.

Each end of the axle 96 affords a support for a member 102 which may be conveniently referred to as a steering knuckle. The knuckle 102 preferably surrounds the axle and is supported for rotation on a king pin 104, the latter passing through the axle and being secured therein as indicated at 105.

The steering knuckle 102 is formed with a rearwardly extending arm 108 terminating in a boss or bearing portion 111, and an arm 110 which serves to support the road wheel assembly and which in effect forms a part of the latter is pivotally connected to the boss 111 for swinging movement with respect thereto in a substantially vertical plane. For instance, the arm 110 may be provided at its rearward end with a spindle 112 journalled in the boss 111 and extending therethrough for cooperation with shock absorbing means within the casing 49 which may be constructed in any conventional manner, for instance as hereinbefore described, the shock absorber acting between the arms 108 and 110 to resist sudden vertical movement of the latter.

The forward end of the arm 110 merges into a plate 113 which carries a wheel spindle 114 on which the vehicle wheel 141 may be rotatably mounted.

Formed on or secured to the forward portion of the plate 113 is a lug 116, a link 117 being pivotally connected to this lug as indicated at 118 and being pivotally connected at 120 to one arm of a bell crank lever 122. The steering knuckle 102 is provided with an upwardly directed arm 125 on which the bell crank lever 122 is pivotally mounted as indicated at 126.

The steering knuckle 102 is further provided with a forwardly directed arm 128, to the outer face of which is secured a leaf spring assembly 130, the spring being retained in position on the arm by bolts 131.

It will be seen from the drawings that the leaf spring, as in the previously described form of the invention, lies in a substantially vertical plane extending normally longitudinally of the vehicle, but in the form of the invention now being described the spring is directed upwardly as well as rearwardly. At its outer end this spring is pivotally connected as indicated at 135 to a link 136, the other end of the link being connected as at 137 to the remaining arm of the bell crank lever 122.

A steering arm 138 is secured to the steering knuckle 102 and is pivotally connected to a drag link 64 which is connected to the manually operable steering mechanism in the conventional manner, for instance as pointed out in connection with the first described form of the invention. The arm 138 is of course provided only on that steering knuckle 102 which is at the left or steering side of the vehicle, the construction at the right hand side of the vehicle being otherwise identical. The steering knuckles 102 at opposite sides of the vehicle are connected for simultaneous movement by means of a cross tie rod 70, this rod being pivotally secured to any convenient portion of the knuckle, for instance to the underside of the rearwardly extending arm 108 as indicated at 138.

It will be observed that this second modification is somewhat similar in structure and function to the first described form of the invention. Thus the leaf spring assembly 130 is carried by the steering knuckle and moves therewith during steering movements. By reason of the fact that the knuckle is supported on the vehicle frame, all of the elements of the steering gear may be supported on the frame and will partake of no relative movement in response to vertical movement of the road wheels on encountering an obstruction. When such vertical movement occurs, the road wheel assembly swings upwardly, thus rocking the bell crank lever 122 about its pivotal axis 126 and flexing the spring 130. The only force which can be applied to the leaf spring 130 is that which tends to flex it in the plane in which it lies, any twisting or lateral stress being eliminated, with the result that the life of the spring is appreciably extended.

By reason of the fact that the steering knuckle partakes of no vertical movement with respect to the vehicle frame, it is possible to provide a wheel fairing carried by the knuckle and movable therewith during steering movement of the latter for deflecting air currents from the wheels and associated parts to decrease the wind resistance. Thus the fairing may comprise an apron 140 extending generally parallel with the outer face of the road wheel 141 and directed inwardly fore and aft of the road wheel as indicated at 142. This apron may extend downwardly to an extent sufficient to form in effect a continuation of the lowest portion of the vehicle fender 144 and may extend slightly within the fender. By forming the inwardly directed portions 142 of the apron 140 as arcs described about the axis of the steering knuckle, these portions may readily clear the fender as the knuckle is swung for steering the vehicle.

The apron 140 may be conveniently secured to the knuckle at the forward and rear portions of the latter, for instance a supporting bracket 146 may be clamped on the leaf spring assembly by means of the bolts 131 between the spring and the plate 132, and a supporting bracket 147 may be bolted or otherwise rigidly secured to the rear face of the boss 111, the brackets 146 and 147 being secured to portions of the apron 140 as indicated at 148 and 149 respectively.

The fender 144 may be extended in the form of an apron 150 across the front of the vehicle and by the combined action of the fender and the apron 140, excellent streamlining can be secured.

In both of the modifications disclosed herein the spring suspension system is located further from the center line of the car and further forward than in conventional designs. Accordingly, the mass of the suspension offers a greater resistance to jolts and vibration ordinarily transmitted through the springs. Furthermore, side sway on rounding a curve is substantially eliminated owing to the fact that the springs act at points located adjacent the road wheels, this side sway in conventional constructions being largely the result of the location of the springs much nearer the center line of the vehicle.

Since the entire wheel assembly including the spring suspension constitutes in effect a relatively compact unit supported on the end of the axle, the assembly and servicing of the parts is greatly facilitated. It will also be seen that with the present arrangement standard width between wheels and between side frame members can be employed without reduction of the maximum angle to which the wheels can be turned for steering purposes. Thus in the modification shown in Figures 1 to 3 of the drawings the rear portion of the steering knuckles 35 and the parts associated therewith may be readily swung to a position under the associated side frame members 12 with no sacrifice in the compactness of the suspension. In the arrangement shown in Figures 5 to 8 of the drawings, ample clearance is provided for swinging movement of the knuckles and associated parts laterally of the side frame members owing to the different disposition of the leaf spring assembly.

Having thus described the invention, what is claimed as new and desired to be secured by Letters Patent is:

1. In a motor vehicle, the combination with a vehicle frame, of a steering knuckle carried by said frame, said knuckle being provided with a rearwardly extending substantially horizontal arm, a road wheel assembly located substantially laterally of said knuckle, a link supporting said assembly and extending rearwardly and forwardly therefrom, said link being pivotally connected to said knuckle arm for movement with respect thereto in a substantially vertical plane, and means including a leaf spring assembly acting between opposite ends of said arm and link to resist relative movement thereof.

2. In a motor vehicle, the combination with a vehicle frame, of a steering knuckle carried by said frame, said knuckle being provided with a rearwardly extending substantially horizontal arm, a road wheel assembly located substantially laterally of said knuckle, a link supporting said assembly and extending rearwardly and forwardly therefrom, said link being pivotally connected to said knuckle arm for movement with respect thereto in a substantially vertical plane, and a leaf spring assembly carried by said knuckle toward the rear of said knuckle arm and connected to said wheel assembly supporting link at a point forward of said assembly to resist relative vertical movement of said arm and link.

3. In a motor vehicle, the combination with a vehicle frame, of a steering knuckle carried by said frame, said knuckle being provided with a rearwardly extending substantially horizontal arm, a road wheel assembly located substantially laterally of said knuckle, an arm supporting said assembly and extending rearwardly therefrom, said arm being pivotally connected to said knuckle arm for movement with respect thereto in a substantially vertical plane, a leaf spring assembly carried by said knuckle, and connections between said leaf spring assembly and said wheel assembly for resisting vertical movement of the latter with respect to said knuckle, said leaf spring assembly being secured to the forward portion of said knuckle and extending in a generally upward direction.

4. In a motor vehicle, the combination with a vehicle frame, of a steering knuckle carried by said frame, said knuckle being provided with a rearwardly extending substantially horizontal arm, a road wheel assembly located substantially laterally of said knuckle, an arm supporting said assembly and extending rearwardly therefrom, said arm being pivotally connected to said knuckle arm for movement with respect thereto in a substantially vertical plane, a leaf spring assembly carried by said knuckle toward the rear of said knuckle arm and connected to said wheel assembly to resist relative vertical movement of said arms, and a shock absorber acting at the point of pivotal connection of said arms to resist sudden relative vertical movement thereof.

5. In a motor vehicle, the combination with a vehicle frame, of a steering knuckle carried by said frame, an arm rigid with said knuckle, a wheel supporting link secured to said arm by an approximately horizontal pivotal connection, said arm and said link lying generally side by side in a substantially horizontal plane, a road wheel supported intermediate the ends of said link, and means including a leaf spring assembly acting between opposite ends of said arm and link and extending generally in the direction of said arm and link for resisting relative vertical movement thereof.

FRANK C. BEST.